(12) United States Patent
Borillo et al.

(10) Patent No.: US 7,676,447 B2
(45) Date of Patent: Mar. 9, 2010

(54) CONTROL SYSTEM AND METHOD FOR CONTROLLING EXECUTION OF SCIENTIFIC EXPERIMENTS BY LABORATORY INSTRUMENTS

(75) Inventors: Dante Borillo, Cork (IE); Kevin Brendan Keenan, County Laois (IE)

(73) Assignee: Kinematik Research Limited, County Cork (IE)

( * ) Notice: Subject to any disclaimer, the term of this patent is extended or adjusted under 35 U.S.C. 154(b) by 722 days.

(21) Appl. No.: 11/350,883

(22) Filed: Feb. 10, 2006

(65) Prior Publication Data
US 2006/0194350 A1 Aug. 31, 2006

(30) Foreign Application Priority Data
Feb. 11, 2005 (IE) .................................. 2005/0071

(51) Int. Cl.
*G06F 15/00* (2006.01)
(52) U.S. Cl. ........................... 706/62; 700/17; 700/108
(58) Field of Classification Search .................. 706/62; 707/17, 108
See application file for complete search history.

(56) References Cited
FOREIGN PATENT DOCUMENTS
WO WO03/005249 1/2003

OTHER PUBLICATIONS

Bunch et al ("Software Agents for Process Monitoring and Notification" Mar. 2004.*

Bigus et al ("ABLE: A toolkit for building multiagent autonomic systems" 2002).*
Antti Pakonen ("Information Agent Technology in Process Automation Systems" Nov. 2004).*

* cited by examiner

*Primary Examiner*—David R Vincent
*Assistant Examiner*—Lut Wong
(74) *Attorney, Agent, or Firm*—Jacobson Holman PLLC

(57) ABSTRACT

A scientific experiment control system includes a main controller for high-level control, an experimental manager for lower-level control of scientific experiments, and a roll-up engine for automatically propagating modifications (or "changes") within the system to ensure consistency across the system and instruments which are linked to it in an automatic and dynamic manner. When any of experiment control objects automatically detects a change event as defined by any of the metrics inherited from the metric objects it transmits a notification to an interface. The latter automatically instantiates a change event object, which is managed in a queue by an input interface of the roll-up engine. The roll-up engine automatically interrogates the network of objects contained in the program object to determine the identity of every object in the hierarchy down to the notifying object which is involved in performance of the current experiment run. It then automatically transmits a notification to each of these identified objects.

14 Claims, 3 Drawing Sheets

CONTROL SYSTEM AND METHOD FOR CONTROLLING EXECUTION OF SCIENTIFIC EXPERIMENTS BY LABORATORY INSTRUMENTS

INTRODUCTION

1. Field of the Invention

The information relates to a control system for laboratory experiments.

2. Prior Art Discussion

It is known to provide an object-oriented control system for such purposes, such as described in our European Patent Application Number EP1412850.

However, a problem with existing control systems is that there are difficulties in ensuring consistency across a wide range of experiment runs in a full project if a change takes place in one experiment, which change affects other experiments. In a simple example, a number of experiments are carried out by mass spectrometry instruments, with results from one phase feeding into another. However, a change in calibration of only a single instrument for an experiment in one phase can have an effect on subsequent experiments, with a requirement for re-calibration of other instruments and possibly also a difference in settings for software functions for transmitting instrument control signals and for processing instrument output data. There can be very complex inter-relationships for propagation of changes or modifications across hardware instruments and such software functions.

The invention is therefore directed towards providing for improved automation for consistent updates in response to changes in a control system for controlling execution of scientific experiments by laboratory instruments.

SUMMARY OF INVENTION

According to the invention, there is provided a control system for controlling execution of scientific experiments by laboratory instruments, the control system comprising a control manager for instantiating objects in a containment relationship to control experiments. The experiment control objects automatically trigger change events according to pre-set metrics. The control system further comprises a roll-up engine for dynamically monitoring change events during execution of experiments, and the roll-up engine automatically transmits a change notification to all concerned experiment control objects when a change event occurs.

In one embodiment, the experiment control objects have software code methods for automatically responding intelligently to said notifications to dynamically modify their experiment control operations.

In one embodiment, the roll-up engine includes in a notification data indicating the change event in terms of pre-defined metrics.

In another embodiment, the system further comprises a metrics manager for defining said metrics independently of the control manager.

In a further embodiment, the metrics manager:

generates an interface, and generates at least one metric object linked with the interface, each metric object defining at least one metric.

In another embodiment, the metrics manage associates experiment control object with said interface, such that they inherit the metrics from the metric objects.

In one embodiment, the interface is an object instantiated by the metrics manager and containing the metric objects.

In one embodiment, the metrics manager associates experiment control objects with the metric objects by associating them with the interface so that they automatically inherit attributes of the metric objects.

In one embodiment, the roll-up engine automatically determines which experiment control objects are concerned with a change event.

In one embodiment, the roll-up engine automatically determines said experiment control objects by interrogating hierarchical relationships between experiment control objects linked with an experiment control object which triggered the change event.

In one embodiment, the metrics manager generates a hierarchy of interfaces and the roll-up engine listens to said hierarchy of interfaces for change events.

In one embodiment, the interface, when notified of a change event by any of the experiment control objects, automatically instantiates a change event object.

In one embodiment, the roll-up engine automatically manages a queue of said change event objects, processing each one in turn.

In one embodiment, at least some of the experiment control objects have software code methods for automatically triggering modification of a metric object in response to a change event.

In one embodiment, said experiment control objects transmit a metric object modification instruction to the metric object to be modified via the interface.

In one embodiment, the control manager instantiates a high-level container object for an experiment program, and other experiment control objects are contained under said object.

In one embodiment, a phase experiment control object is contained by a program object and is linked with a gate object for iteratively monitoring experiment data to determine if a current experiment phase should terminate and a further phase should be initiated.

In another aspect, the invention provides a method of controlling a plurality of experiment runs by laboratory instruments, the method comprising the steps of coupling the instruments to any control system as defined above, the experiment control objects generating control signals for the instruments, processing instrument outputs, and automatically triggering change events by comparing experiment data being processed with said pre-set metrics.

In one embodiment, the instruments have different calibrations, and a change in calibration of a calibration setting in an instrument causes an experiment control object to trigger a change event.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:—

DESCRIPTION OF THE EMBODIMENTS

Figure 1:
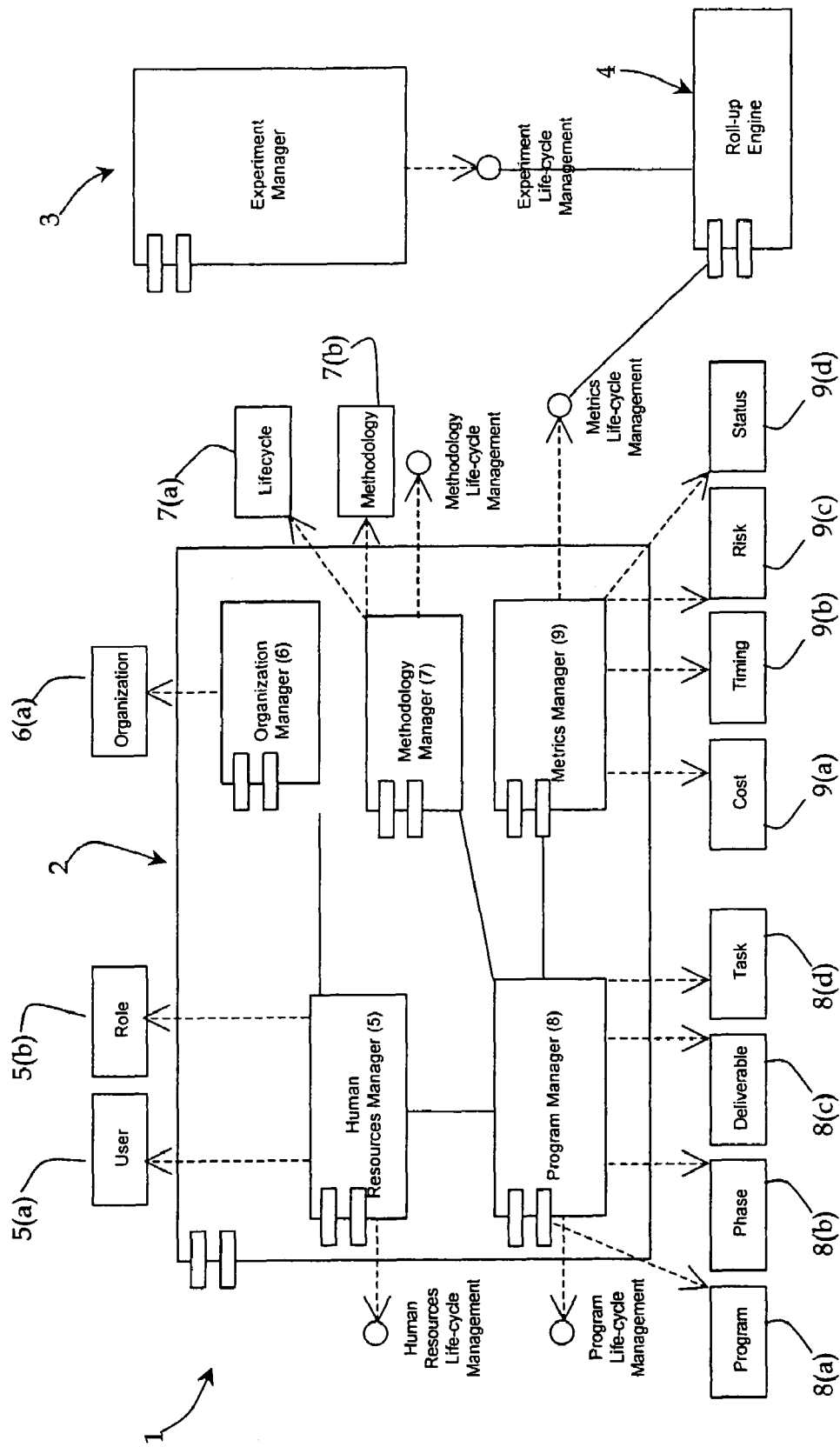
FIG. 1 is a UML (Unified Modelling Language) component view of a control system of the invention.

Referring to FIG. 1, a scientific experiment control system 1 includes a main controller 2 for high-level control, an experimental manager 3 for lower-level control of scientific experiments, and a roll-up engine 4 for automatically propagating modifications (or "changes") within the system 1 to ensure consistency across the system 1 and instruments which are linked to it in an automatic and dynamic manner.

The main controller 2 comprises five main components:

a human resources manager 5 for managing the life-cycle of project human resources, assigning them specific roles;

an organization manager 6 for managing the life-cycle of organizations related to projects such as suppliers, customers, internal groups or divisions;

a methodology manager 7 for managing different life-cycles and methodologies used for handling scientific projects, a project manager 8 for managing projects; and a metrics manager 9 for managing metrics such as experiment cost, schedule, risk, and status.

These components expose interfaces for the management of the life-cycle of dedicated objects. By life-cycle it is intended the following set of minimal operations: CRUD (Create, Read, Update, Delete) and any additional operation required by the specific object logic.

Figure 2:
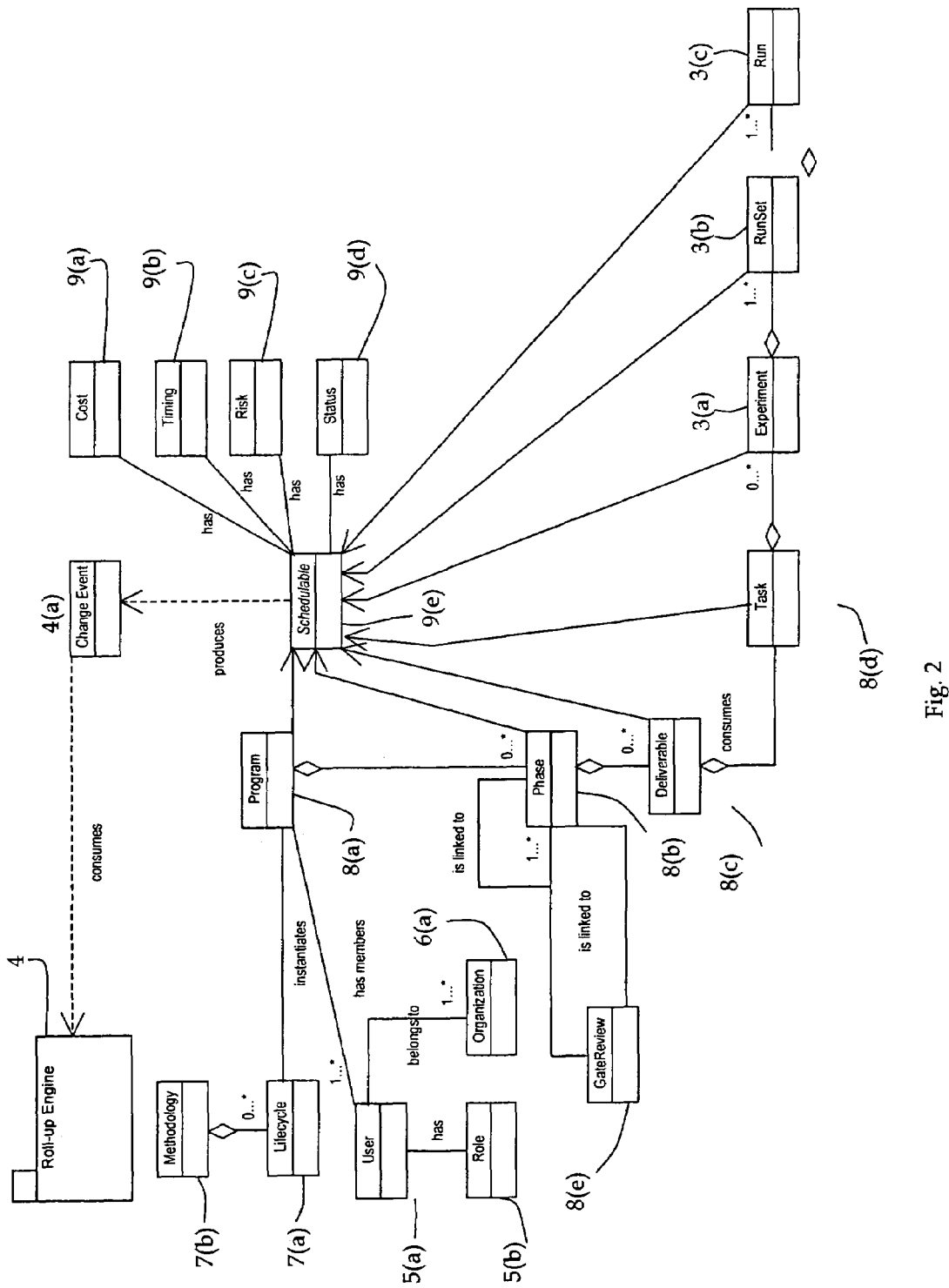
FIG. 2 is a UML class diagram representing a domain model view of the system.

FIG. 1 also shows examples of classes for instantiation of run-time objects by the components 5 to 9, as follows:

5(a), control system user;
5(b), control system user role;
6(a), organisation of users having roles;
7(a), 7(b), classes for objects at a high (container) level for containing multiple experiment programs;
8(a), class for instantiating a container object for one or more experiment programs;
8(b), a class for a container object for each experiment phase;
8(c), a class for an object for defining experiment task deliverables such as milestones for results;
8(d), a class for an object for each task, defining a set of actions to complete a task;
9(a)-9(d), classes for objects for metrics to automatically trigger change events during runtime, as described in more detail below with reference to FIG. 2.

The experiment manager 3 instantiates objects from the following classes:

3(a), experiment classes having methods for implementation of experiments;
3(b), RunSet being a container object for Runs; and
3(c), Run classes having methods for recording experimental data such as inputs derived from instrument integration.

It will be noted that the program manager 8 and the experiment manager 3 together manage instantiation and the full life-cycle of objects in a hierarchy for control of scientific instruments coupled to the system and interfacing with the lowest-level objects, managed by the experiment manager 3. When the number of instruments and/or the number of experiment run iterations and phases becomes large, the control and instrument output information processing becomes very complex. In the invention, the roll-up engine plays a very important role in dynamically managing changes in run-time, ensuring that instrument settings such as calibration settings and software functions for processing the output data is dynamically updated.

Referring to FIG. 2 the structure of the control system 1 for run-time control of implementation of experiments is shown. This diagram shows instantiated objects, and for clarity they are assigned the same numerals as the corresponding classes of FIG. 1 from which they are instantiated.

The metrics manager 9 instantiates an interface "Schedulable" object 9(e) from an abstract interface class. The Schedulable object 9(e) does not have methods for performance of any experiment-related operation. However it has methods for containing metrics objects, each of which defines metrics to be used during performance of experiments. The metric objects 9(a) to 9(d) are merely examples, a major benefit of the system 1 being that metrics can be readily created by the metrics manager 9 simply instantiating additional metrics objects. There is also considerable versatility in the manner in which any particular metric is defined because of versatility in the attributes and program code methods of the metrics objects.

The Schedulable object 9(e) also has methods to allow the "task" objects 3(a) to 3(c) and 8(a) to 8(d) inclusive inherit from the metric objects. Thus, the arrows between the objects 3(a) to 3(c), 8(a) to 8(d) and the Schedulable object 9(e) show that they automatically inherit metrics from the metric objects 9(a) to 9(d). Thus by simply providing the Schedulable object 9(e) and instantiating the metric objects as desired according to experiment run specifications the control system 1 automatically ensures that all of the experiment control objects use these metrics to trigger change events.

The metrics are in this embodiment as follows:

cost 9(a), cost in terms of a specified resource such as human, equipment, of finance;
timing 9(b), time-based metrics for performance of experiments;
risk 9(c), the probabilities that certain adverse actions will take place, such as data contamination;
status 9(d), the status of a particular experiment, such as "in-process", "pending", or "holding".

Upon instantiation, each of the objects 3(a) to 3(c) and 8(a) to 8(d) executes to control experiments and process outputted data. These objects are quite substantial, having sufficient code to control the experiments from a very low-level. An example is a project to test four instruments for mass spectrometry analysis to see which one is providing the most accurate results. In this example:

objects 7(a), 7(b) and 8(a) contain high-level container attributes;
the phase objects 8(b) contain deliverables for mass spectrometry analysis;
the deliverable objects 8(c) define milestones to achieve testing of the instrumentation;
the task objects 8(a) are sets of experiments carried on to test the instrumentation;
experiment objects 3(a) are data collection point for experimental data;
RunSet objects 3(b) are collections of Runs;
Run objects 3(c) have attributes defining calibration information, data acquisition attributes, and instrument control signals for the specific tests to be performed.

An advantageous aspect of the program manager 8 is that it instantiates a gate object 8(e) for controlling linkages from one phase to the other. The gate object can compute when the project is moving forward to the next phase/phases based on calculation performed on data propagated through the object hierarchy from the experimental level up to the project manager level.

When any of the objects 3(a) to 3(c) or 8(a) to 8(d) automatically detects a change event as defined by any of the metrics inherited from the objects 9(a) to 9(d) it transmits a notification to the interface 9(e). The latter automatically instantiates a change event object 4(a), which is managed in a queue by an input interface of the roll-up engine 4. The roll-up engine 4 automatically interrogates the network of objects contained in the program object 8(a) to determine the identity of every object in the hierarchy down to the notifying object which is involved in performance of the current experiment run. It then automatically transmits a notification to each of these identified objects. The notification is simply a message identifying the event and the change event originating object. Each object which receives the notification has sufficient codes in its software code methods to automatically act upon the notification to implement the actions considered necessary.

Figure 3:
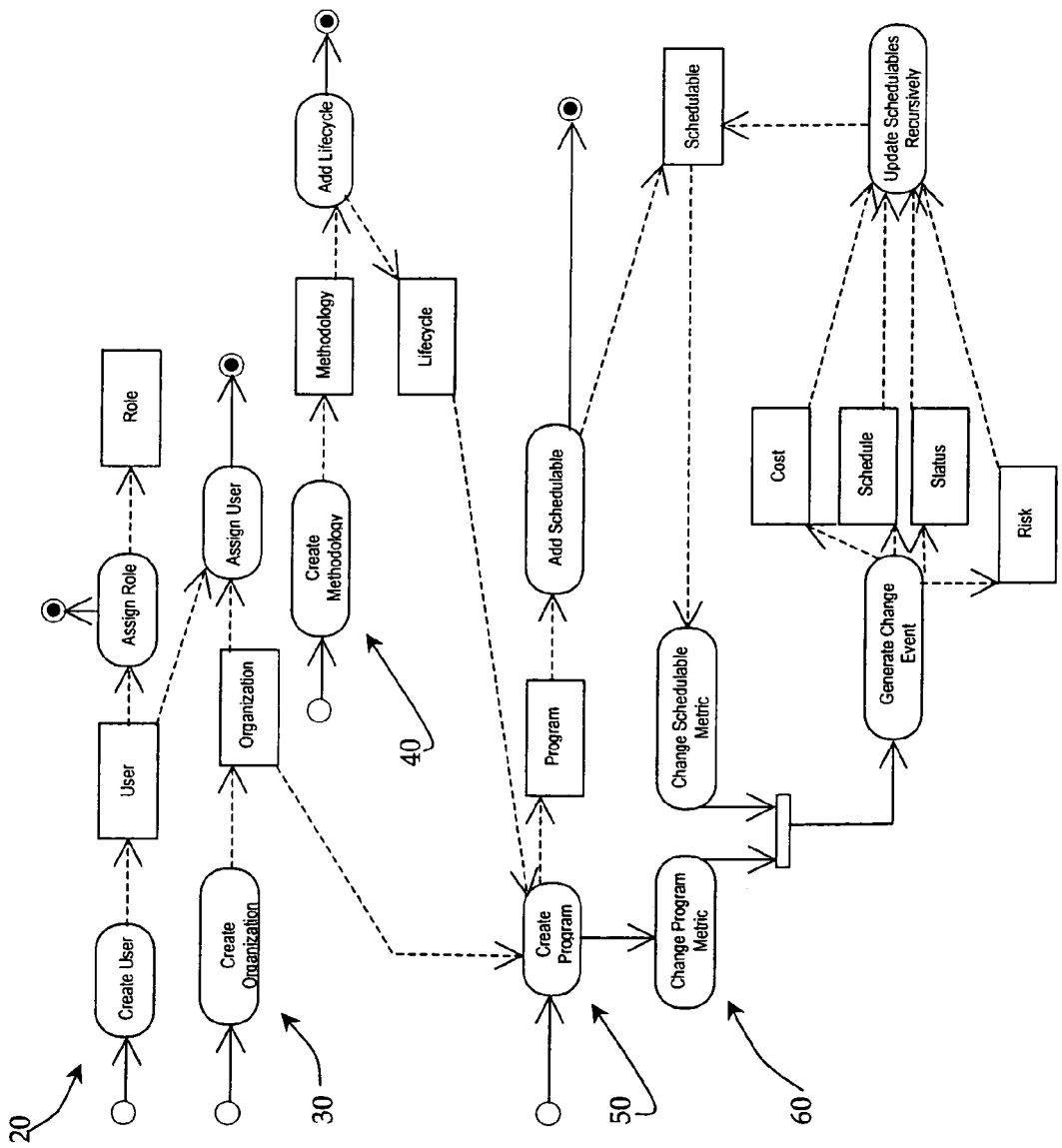
FIG. 3 is a UML activity view.

Overall operation of the control system is illustrated in FIG. 3. The following are the major sequences which are performed.

20, 30; The managers 5 and 6 generate definitions of users, roles, and an organization with users having specific access control rights;

40; The manager 7 creates high level experiment methodology and lifecycle objects to act as containers for the lower-level control objects as illustrated in FIG. 2.

50; The program manager 8 generates these lower level objects and the metrics manager 9 generates the interface "Schedulable" objects defining inheritance of metrics.

60; Upon generation of a change event the relevant objects 8(a) to 8(d) and 3(a) to 3(c) are notified. Another aspect here is the automatic updating of the metric objects 9(a) to 9(d) themselves. These are triggered by the relevant objects 8(a) to 8(d) and 3(a) to 3(c) as they have sufficient intelligence in their method software code to do this. Thus, a metric may trigger a change, and this will result in automatic updating of another metric. Keeping with the example of calibration changes in instruments, such a change may trigger a change event according to the Risk metric because there is a higher risk of data contamination due to a previous mis-calibration. There are the consequent notifications to the concerned controlling objects in the control hierarchy, but also an automatic change in the metric for future monitoring of timing. Again, the system 1 provides complete versatility in not only automatic triggering of change events in run-time, but also in how future change events are triggered by dynamic modification of the metrics.

The main object type, responsible for integration between the experiment manager 3 objects and the program manager 2 objects is the Schedulable object type. Each object derived (in terms of inheritance) from a schedulable object is a candidate for treatment by the roll-up engine 4 and therefore for exchanging scientific and business metrics information.

Object types associated with schedulable object types can have their own internal attributes managed by the metrics manager 9. For example, a status object can represent different status configurations for a project such as: planning, active, completed, inactive, cancelled; timing objects can represent project planned start and finish dates, forecast project completion, and actual duration and work effort.

"Concerned" object types follow a parent-child relationship structure represented in FIG. 2 in terms of program objects containing phase objects containing deliverable objects containing task objects. A program object type represents a portfolio project which is derived from a life-cycle object type contained in a methodology library. Each program is the result of composition of one or more phase objects and/or gate review objects. Phase object types represent a phase of a project, while a gate review is a conditional status type of object providing access to subsequent phase objects within a program.

Program and phase object types can contain directly or indirectly deliverable object types representing items to be completed in order to progress related phases or projects. In order to complete deliverables, users are required to perform task objects.

The system scenario is completed by providing access rights for CRUD operations to schedulable object types performed at the level of program object types by assigning user objects to project roles. This process is managed by the human resources manager 5.

It will be appreciated that the invention provides for automatic comprehensive updating of all relevant objects when a change occurs which affects them. Thus, the invention achieves the complexity of a detailed control and information processing structure, while at the same time benefiting from ease of modification to incorporate changes. Other advantages include the presence of a project and portfolio management system which is automatically integrated to a scientific data capturing system, providing the user with an operational and scientific interface which are fully integrated and can track the life-cycle of a scientific project from its conception, down to the daily operations concerns, capturing not only the scientific data, but also business information associated to projects.

The invention is not limited to the embodiments described but may be varied in construction and detail.

The invention claimed is:

1. A control system for controlling execution of scientific experiments by laboratory instruments, the control system comprising:
   a control manager, a metrics manager, and a roll-up engine;
   the control manager instantiating experiment control objects in containment relationships linking said experiment control objects, said experiment control objects being adapted to interface with the laboratory instruments to control an experiment;
   the metrics manager defining experiment metrics independently of the control manager by:
      generating an interface, said interface being an object instantiated by the metrics manager and containing metric objects each defining at least one metric, and instantiating at least one said metric object, and
      associating experiment control objects with said interface such that said experiment control objects inherit attributes from the metric objects;
   the roll up engine dynamically monitoring change events during execution of the experiment by the instruments;
   the roll-up engine to automatically transmitting a change notification to experiment control objects when a change event occurs, said notification including data indicating the change event in terms of pre-defined metrics; and
   said experiment control objects receiving a change notification automatically responding by dynamically modifying their experiment control operations,
   said experiment control objects including a phase object and a gate object, said phase object being linked with the gate object. and said gate object being adapted to iteratively monitor experiment data to determine if a current experiment phase should terminate and if a further phase should be initiated.

2. The control system as claimed in claim 1, wherein the roll-up engine automatically determines which experiment control objects are to be notified by interrogating hierarchical relationships between experiment control objects linked with an experiment control object which triggered the change event.

3. The control system as claimed in claim 1, wherein the metrics manager generates a hierarchy of interfaces and the roll-up engine listens to said hierarchy of interfaces for change events.

4. The control system as claimed in claim 1, wherein: the interface, when notified of a change event by any of the experiment control objects, automatically instantiates a change event object, and the roll-up engine automatically manages a queue of said change event objects, processing each one in turn.

5. The control system as claimed in claim 1, wherein at least some of the experiment control objects are for:

automatically triggering modification of a metric object in response to a change event, and transmitting a metric object modification instruction to the metric object to be modified via the interface.

6. The control system as claimed in claim 1, wherein the control manager is instantiate for instantiating a high-level container object for an experiment program and other experiment control objects are contained under said object.

7. The control system as claimed in claim 1, wherein the instruments have different calibrations and a change in calibration of a calibration setting in an instrument causes an experiment control object to trigger a change event.

8. A method of controlling execution of scientific experiments by laboratory instruments, the method being performed by a control system programmed with a control manager, a metrics manager, and a roll-up engine, the method comprising the steps of:

instantiating experiment control objects by the control manager in containment relationships linking said objects;

interfacing said experiment control objects with the laboratory instruments to control an experiment;

the metrics manager defining experiment metrics independently of the control manager by:

generating an interface, said interface being an object instantiated by the metrics manager and containing metric objects each defining at least one metric, and instantiating at least one said metric object, and associating experiment control objects with said interface such that said experiment control objects inherit attributes from the metric objects;

dynamically monitoring change events by the roll up engine during execution of the experiment by the instruments;

automatically transmitting a change notification to experiment control objects by the roll-up engine when a change event occurs, said notification including data indicating the change event in terms of pre-defined metrics; and said experiment control objects which receive a change notification automatically responding by dynamically modifying their experiment control operations, said experiment control objects including a phase object and a gate object, said phase object being linked with the gate object which iteratively monitors experiment data to determine if a current experiment phase should terminate and if a further phase should be initiated.

9. The method as claimed in claim 8, wherein the roll-up engine automatically determines which experiment control objects are to be notified by interrogating hierarchical relationships between experiment control objects linked with an experiment control object which triggered the change event.

10. The method as claimed in claim 8, wherein the metrics manager generates a hierarchy of interfaces and the roll-up engine listens to said hierarchy of interfaces for change events.

11. The method as claimed in claim 8, wherein:

the interface, when notified of a change event by any of the experiment control objects, automatically instantiates a change event object, and the roll-up engine automatically manages a queue of said change event objects, processing each one in turn.

12. The method as claimed in claim 8, wherein at least some of the experiment control objects:

automatically trigger modification of a metric object in response to a change event, and transmit a metric object modification instruction to the metric object to be modified via the interface.

13. The method as claimed in claim 8, wherein the control manager instantiates a high-level container object for an experiment program and other experiment control objects are contained under said object.

14. The method as claimed in claim 8, wherein the instruments have different calibrations and a change in calibration of a calibration setting in an instrument causes an experiment control object to trigger a change event.

* * * * *